United States Patent
Howard

(10) Patent No.: US 9,510,610 B2
(45) Date of Patent: Dec. 6, 2016

(54) PROCESS FOR PRODUCING PRECOOKED BACON SLICES

(75) Inventor: David Howard, Bristow, OK (US)

(73) Assignee: Unitherm Food Systems, Inc., Bristow, OK (US)

( * ) Notice: Subject to any disclaimer, the term of this patent is extended or adjusted under 35 U.S.C. 154(b) by 0 days.

(21) Appl. No.: 13/401,167

(22) Filed: Feb. 21, 2012

(65) Prior Publication Data

US 2012/0148719 A1    Jun. 14, 2012

Related U.S. Application Data

(63) Continuation of application No. 12/013,337, filed on Jan. 11, 2008, now abandoned.

(51) Int. Cl.
| | | |
|---|---|---|
| *A23L 1/01* | (2006.01) | |
| *F27D 11/00* | (2006.01) | |
| *A47J 27/16* | (2006.01) | |
| *B65G 27/02* | (2006.01) | |
| *A21B 1/00* | (2006.01) | |

(52) U.S. Cl.
CPC ............. *A23L 1/0121* (2013.01); *A23L 5/13* (2016.08); *A23L 5/15* (2016.08); *A23L 13/00* (2016.08); *A21B 1/00* (2013.01); *A23V 2002/00* (2013.01); *A47J 27/16* (2013.01); *B65G 27/02* (2013.01); *F27D 11/00* (2013.01)

(58) Field of Classification Search
CPC ............. A23L 1/01; A23L 1/31; A22C 5/00; A21B 1/00; A47J 37/00; A47J 27/16; A47J 37/04; F27D 11/00; B65G 27/02
USPC ............... 426/510, 523, 511, 236; 99/443 C, 99/443 R, 447, 355
See application file for complete search history.

(56) References Cited

U.S. PATENT DOCUMENTS

| | | | | |
|---|---|---|---|---|
| 3,212,426 A | * | 10/1965 | Lewus | A47J 27/04 126/369 |
| 3,873,755 A | * | 3/1975 | McKay | 426/523 |
| 4,354,815 A | | 10/1982 | Bardsley et al. | |
| 4,582,484 A | | 4/1986 | Sandor | |

(Continued)

FOREIGN PATENT DOCUMENTS

| | | |
|---|---|---|
| EP | 1386544 A1 | 2/2004 |
| GB | 1092769 A | 11/1967 |
| JP | 2000296167 | 10/2000 |

OTHER PUBLICATIONS

Ahmed Elamin, "Spiral Oven Reduces Operating Costs, Claims Manufacturer", Dec. 6, 2007, Publisher: Decisionnewsmedia, 2 pages.

(Continued)

*Primary Examiner* — Erik Kashnikow
*Assistant Examiner* — Preston Smith
(74) *Attorney, Agent, or Firm* — GableGotwals

(57) ABSTRACT

A process for producing precooked bacon slices comprising the steps of (a) conveying bacon slices through a spiral oven, (b) indirectly cooking the bacon slices in the spiral oven using a cooking medium which is circulated within the oven at a low rate sufficient to prevent the bacon slices from being displaced on the conveyor, and (c) adding steam to the cooking medium as necessary to at least reduce the percentage or substantially eliminate the presence of air in the cooking medium.

3 Claims, 1 Drawing Sheet

(56) References Cited

U.S. PATENT DOCUMENTS

| | | | |
|---|---|---|---|
| 4,737,373 A * | 4/1988 | Forney | A47J 37/044 |
| | | | 426/510 |
| 4,829,158 A * | 5/1989 | Burnham | 219/400 |
| 4,957,756 A | 9/1990 | Olander et al. | |
| 5,078,120 A * | 1/1992 | Hwang | 126/21 A |
| 5,520,944 A | 5/1996 | Richardson et al. | |
| 5,694,835 A | 12/1997 | Mangina | |
| 5,997,925 A | 12/1999 | Wilson et al. | |
| 6,045,841 A | 4/2000 | Singh | |
| 6,146,678 A * | 11/2000 | Caridis et al. | 426/510 |
| 6,713,106 B1 * | 3/2004 | Underwood et al. | 426/264 |
| 7,107,899 B2 | 9/2006 | Nothum, Jr. | |
| 2004/0022909 A1 * | 2/2004 | Holm et al. | 426/510 |
| 2004/0096555 A1 | 5/2004 | Gould | |
| 2005/0092730 A1 | 5/2005 | Nothum | |
| 2006/0032382 A1 | 2/2006 | Nothum | |
| 2006/0207436 A1 | 9/2006 | Nothum | |
| 2007/0023413 A1 * | 2/2007 | Wilson | 219/388 |

OTHER PUBLICATIONS

Press Release regarding "Superior Cross-Belt Temperature Control Improves Bacon Processing" issued by FMC FoodTech, Chicago, IL Dec. 5, 2007, 2 pages.

Noticiation of Transmittal of International Search Report and Written Opinion of the Internaitonal Searching Authority; dated Dec. 23, 2008, USPTO; 8 pages.

European Search Report, Oct. 17, 2011.

* cited by examiner

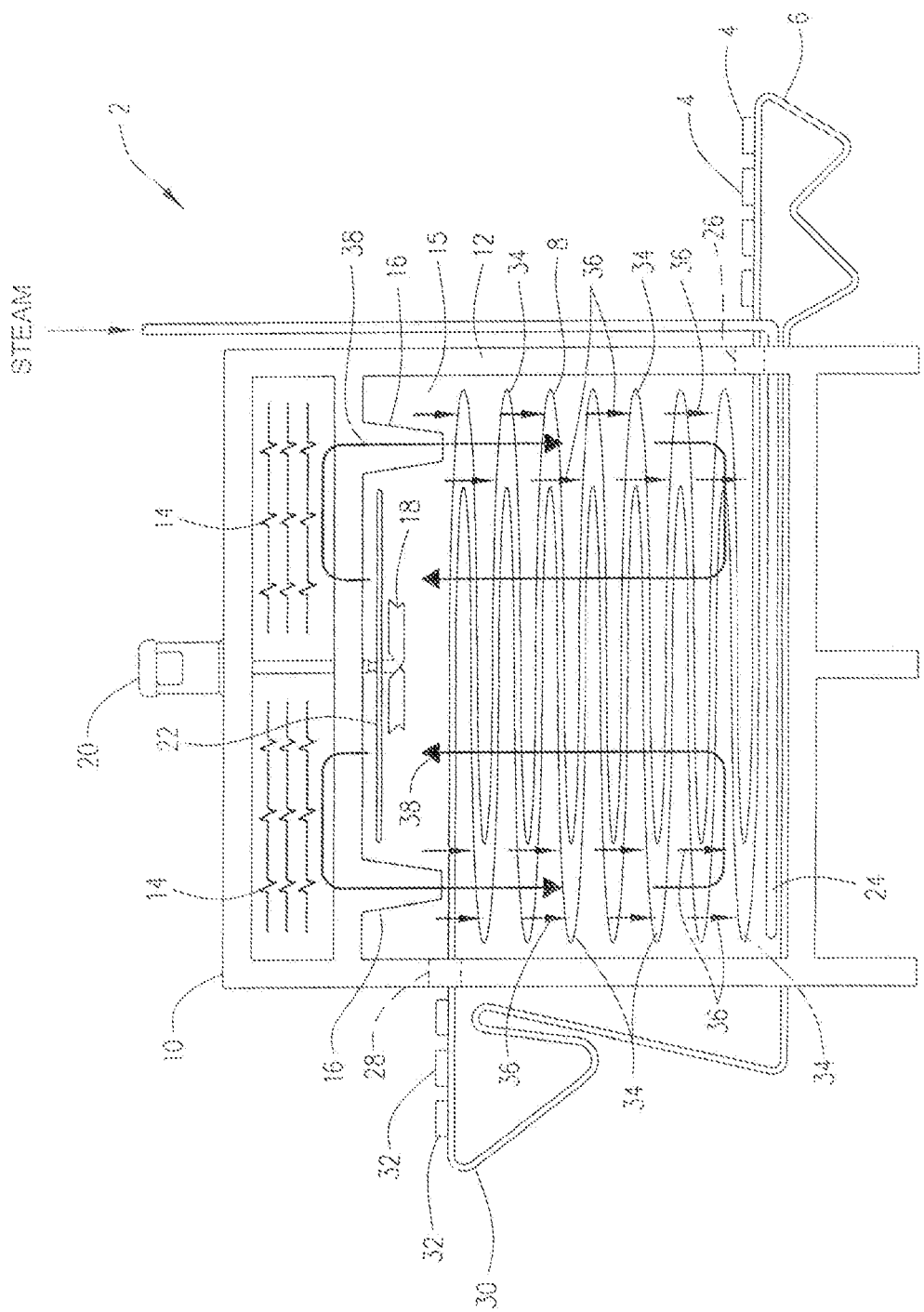

PROCESS FOR PRODUCING PRECOOKED BACON SLICES

REFERENCE TO PENDING APPLICATIONS

This application is a continuation application which claims priority to U.S. patent Application Ser. No. 12/013,337 filed Jan. 11, 2008, and entitled "Process For Producing Precooked Bacon Slices".

FIELD OF THE INVENTION

The present invention relates to processes for continuously cooking bacon slices to produce precooked bacon strips and other precooked sliced bacon products.

BACKGROUND OF THE INVENTION

Because of their thinness, the short cooking time required, and the high fat and water content of the raw product, bacon slices are among the most difficult products to cook consistently. The continuous bacon cooking processes heretofore used in the industry have not been able to provide precooked sliced bacon products having the same texture, bite, mouth feel, color, and appearance as pan-fried products cooked in the home. Thus, a need presently exists for a significantly improved continuous process and system capable of producing such precooked sliced bacon products. A need particularly exists for a process of this type which (a) will provide a production rate similar to the microwave processing systems currently used in the art, (b) will take up less floor space in the processing facility, and (c) will eliminate or at least greatly reduce the fire risk posed by other systems.

Heretofore, in the United States, precooked sliced bacon products have been predominantly produced using continuous microwave oven systems. Such microwave cooking processes have typically involved the steps of (a) preconditioning belly, shoulder, or back bacon or a formed bacon log to a temperature in the range of from about −4° to about 5° C.; (b) passing the preconditioned bacon through a Grote Slicer or similar slicing device; and then (c) conveying the sliced bacon through a continuous microwave oven. As will be understood by those in the art, the Grote Slicer is typically positioned to place the bacon slices directly on the oven conveyor as they are cut.

Unfortunately, the continuous microwave processes heretofore used for producing precooked sliced bacon products have significant shortcomings and disadvantages. For one thing, there are significant organaleptic differences between the product produced by a continuous microwave process versus a traditional home-fried product. This is clue in large part to the fact that the microwave energy has a more pronounced effect on the fat and water components of the bacon than on other parts. Thus, the microwave product has a significantly different texture, mouth feel, bite, appearance, and color. In addition, continuous microwave oven systems can be as much as 70 feet or more in length and, thus, take up a great deal of space in the processing facility.

As an alternative to continuous microwave cooking, precooked sliced bacon products have also been produced using continuous linear circulating air oven systems. Unfortunately, however, the products produced in the linear circulating air oven systems have been even less crisp and lighter in color than the microwave products. In addition, the linear circulating air systems have had a tendency to burn or blacken the edges of the bacon slices and have also required an even greater amount of floor space to achieve throughputs approaching those of the microwave systems. Further, because of the large amount of hot, flammable grease produced when cooking bacon, the fire risk presented by a circulating air oven is very high.

In addition, as will also be understood by those in the art, the general trend in the meat industry for achieving improvements in circulating air cooking processes has been toward the use of increasingly higher flow circulation rates and impingement velocities. Unfortunately, however, the application of high velocity impingement air to the rather delicate, thinly sliced bacon product traveling through the oven causes the product to be displaced on (i.e., to be moved on or blown off of) the oven conveyor belt. Also, linear impingement oven systems would still take up a relatively large amount of space in the processing facility and would present an even greater fire risk for bacon cooking.

SUMMARY OF THE INVENTION

The present invention provides a spiral oven process for preparing precooked sliced bacon products which unexpectedly and surprisingly satisfies the needs and alleviates the problems discussed above. The inventive spiral oven process and system can produce a precooked sliced bacon product of generally any desired crispness and generally any desired color ranging from light gold to very dark golden brown. The inventive system also has a very small footprint and eliminates or at least greatly reduces the fire risk posed by the prior art circulating air oven systems. Moreover, the inventive bacon cooking process will produce a consistent product which does not have burned or blackened outer edges and is much closer than a microwaved product to home-fried bacon.

In one aspect, there is provided a process for continuously cooking bacon comprising the steps of: (a) placing bacon slices on a conveyor of a spiral oven such that the conveyor carries the bacon slices through the spiral oven in a spiral pattern, the spiral oven having at least one opening (e.g., for the conveyor) which is open to atmospheric conditions outside of the spiral oven; (b) indirectly cooking the bacon slices in the spiral oven by contacting the bacon slices with a cooking medium circulating in the spiral oven at an average contacting temperature of at least 325° F. and at a contact flow velocity which is sufficiently low that the bacon slices will not be displaced on the conveyor when contacted by the cooking medium; and (c) adding steam to the cooking medium in a manner effective to maintain the cooking medium during step (b) such that a partial pressure of air which would otherwise be present in the cooking medium without adding the steam in step (c) is reduced by at least 10%.

In another aspect, there is provided a process for continuously cooking bacon comprising the steps of: (a) placing bacon slices on a conveyor of a spiral oven such that the conveyor carries the bacon slices upwardly in the spiral oven in a spiral pattern, the spiral oven having an inlet opening and an outlet opening for the conveyor wherein the inlet and outlet openings are open to atmospheric conditions outside of the spiral oven; (b) indirectly cooking the bacon slices in the spiral oven by contacting the bacon slices for a time in the range of from about 3 to about 9 minutes with a cooking medium circulating in the spiral oven at an average contacting temperature in the range of from about 325° F. to about 650° F. and at a nonimpinging contacting flow velocity which is sufficiently low that the bacon slices will not be displaced on the conveyor when contacted by the cooking medium; and (c) adding steam to the cooking medium in a manner effective to maintain the cooking medium during step (b) such that a partial pressure of air which would otherwise be present in said cooking medium without adding said steam in step (c) is reduced by at least 15%. When initially contacted by the cooking medium in the spiral oven, the bacon slices have a surface temperature which is sufficiently low to cause an amount of water from the cooking medium to initially condense on the bacon slices. In addition, the conveyor is an open conveyor such that fat dripping from those of the bacon slices traveling at higher elevations within the spiral oven will fall onto and baste those of the bacon slices traveling at lower elevations within the spiral oven.

In another aspect, there is provided a process for continuously cooking bacon comprising the steps of: (a) placing bacon slices on a conveyor of a spiral oven such that the conveyor carries said bacon slices upwardly in said spiral oven in a spiral pattern; (b) indirectly cooking the bacon slices in the spiral oven by contacting the bacon slices with a cooking medium circulating in the spiral oven at an average contacting temperature of at least 325° F. and at a contacting flow velocity which is sufficiently low that the bacon slices will not be displaced on the conveyor when contacted by the cooking medium; (c) monitoring the cooking medium during step (b) using an analyzer of a type used for determining a relative humidity or dew point of air and for providing analyzer result readings on a relative humidity percentage scale or other corresponding result scale; and (d) adding steam to the cooking medium in a manner effective to cause an analyzer result reading of or corresponding to a value of at least 10% on the relative humidity percentage scale to be maintained for the cooking medium during step (b).

Further aspects, features, and advantages of the present invention will be apparent to these or ordinary skill in the art upon examining the accompanying drawings and upon reading the following detailed description of the preferred embodiments.

BRIEF DESCRIPTION OF THE DRAWINGS

The drawing schematically illustrates an embodiment 2 of the inventive spiral oven process for continuously cooking bacon slices.

DETAILED DESCRIPTION OF THE PREFERRED EMBODIMENTS

An embodiment 2 of the inventive spiral oven process for continuously cooking bacon slices is illustrated in the accompanying drawing. In the inventive process 2, raw bacon slices 4 are placed on the infeed section 6 of the continuous conveyor belt 8 of a spiral oven 10. The raw bacon slices 4 are preferably laid directly on the conveyor infeed section 6 as they are cut from a bacon source (e.g., belly, shoulder, or back bacon, a formed bacon log, or other source) by a Grote Slicer or similar slicing device.

The spiral oven 10 used in the inventive process 2 preferably comprises: an oven housing 12 having a cooking chamber 15; a plurality of heating elements 14 positioned in the upper portion of the housing 12 above the cooking chamber 15; a plurality of air flow cones or nozzles 16 provided in the upper portion of the housing below the heating elements 14 for delivering the heated cooking medium into the cooking chamber 15; a circulation fan 18 provided in the housing 12 below the heating elements 14; an exterior fan motor 20; an upper steam injection ring 22 positioned between the circulation fan 18 and the heating elements 14; an optional lower steam injection ring 24 provided in the bottom of the combustion chamber 15; a conveyor inlet opening 26 located at an elevation near the bottom of the cooking chamber 15; a conveyor outlet opening 28 located at an elevational near the top of the cooking chamber 15 beneath the air flow cones or nozzles 16; and a conveyor outlet section 30 which delivers the cooked sliced product 32 from the outlet 28 of the spiral oven 10.

As is typical in spiral ovens, the conveyor belt 8 continuously conveys the bacon slices 4 upwardly in the cooking chamber 15 in a spiral pattern as illustrated in the drawing. The belt 8 is preferably an open mesh belt (commercially available from Ashworth Brothers, Cambridge International, and other manufacturers) or other type of open belt such that, as illustrated by basting drippage arrows 36, the fat which drips from the products 4 traveling along the spiral flites 34 at succedingly higher elevations within the oven housing 12 will fall onto and baste the bacon slices 4 traveling along the flites 34 at lower elevations. At the same time, the cooking medium circulation fan 18 circulates the hot cooking medium within the oven housing 12 in a flow pattern 38 such that the fan 18 draws the cooking medium upwardly from the cooking chamber 15 and blows the cooking medium through the upper heating elements 14 and then downwardly via the air flow cones or nozzles 16 back into the cooking chamber 15.

The raw bacon slices 4 placed on the conveyor in feed section 6 can be of any desired type, size, thickness, or shape. The slices 4 will typically be in the form of common breakfast strips which are approximately two inches wide, approximately 10-12 inches long, and from about 1 to about 5 mm thick. Wider slices can be provided, for example, by bonding two bellies together prior to slicing. The thickness of the bacon slices 4 will typically be in the range of from about 1.2 to about 3.5 mm and will more typically be in the range of from about 1.6 to about 3 mm. As mentioned above, because of their relative thinness and the short cooking time required, bacon slices are among the most difficult products to cook consistently.

In accordance with the inventive process 2, the bacon slices 4 are indirectly cooked as they travel upwardly through the cooking chamber 15 of the spiral oven 10 by contacting the bacon slices with the heated cooking medium which is circulated through the oven. In addition, another novel and unexpectedly beneficial aspect of the inventive bacon cooking process is that the cooking medium will preferably be a high enthalpy, superheated vapor medium comprised of at least a high level of water vapor.

The high water vapor content of the cooking medium within the spiral oven 10 will preferably be produced and maintained by injecting steam into the oven 10 as needed via the upper steam injection ring 22. Alternatively, or in addition, steam can be injected into the oven 10 via the steam injection ring 24 within the bottom of the cooking chamber 15. The steam can be saturated steam or superheated steam and will preferably be superheated steam under pressure. The steam used in the inventive process will preferably be superheated steam provided to the inventive cooking system at a pressure of about 40 psig and a temperature of at least 265° F.

The amount of steam used in the inventive process will be an amount effective to reduce the partial pressure of or substantially eliminate the air which would otherwise be present in the "natural" cooking environment if no steam were injected into the spiral oven 10. Without steam injection, the "natural" cooking environment would be comprised of (a) air, (b) volatile organics resulting from the bacon cooking process, and (c) an amount of water vapor derived from the water content of the raw bacon slices 4 and from the atmospheric humidity of the air. As will be understood by those in the art, some additional water content in the "natural" cooking medium environment can also be derived from any moisture which happens to remain on the conveyor belt 8 as a result of the continuous external belt cleaning process used during oven operation.

The reduction of air partial pressure and/or air content in the otherwise natural cooking environment results from the injection of steam and can also further result from the creation of a positive pressure condition with the oven 10. Depending, for example, on the size of the belt inlet and outlet openings 26 and 28 and upon the existence of any other openings, the injection of a sufficient amount of steam into the spiral oven 10 can, and preferably will, create a sufficient positive pressure condition in the oven 10 to substantially prevent outside air from entering the oven openings during operation. Moreover, the design of the spiral oven 10 and the amount of steam injection can be sufficient to create enough of an internal positive pressure condition to cause some of the internal vapor to flow out of oven openings, thus resulting in a steady state condition wherein substantially all of the air has been removed and replaced with steam.

The amount of steam injected into the spiral oven 10 in the inventive bacon cooking process will preferably be an amount sufficient to reduce the partial pressure of air which would otherwise be present in the "natural" cooking environment by at least 10%. The amount of steam injected into the spiral oven 10 will more preferably be an amount sufficient to reduce the partial pressure of air which would otherwise be present by at least 15%, at least 20%, at least 30%, at least 40%, at least 50%, at least 60%, at least 70%, at least 80%, or at least 90%. The amount of steam injected into the spiral oven 10 will most preferably be an amount sufficient to replace substantially all of the air which would otherwise be present in the "natural" cooking environment.

In another surprising and unexpected aspect of the present invention, it has been discovered that an extremely effective method for monitoring and controlling the injection of steam into the spiral oven 10 to target and achieve any desired sliced bacon product characteristics is to use a Vaisala dry cup dew point analyzer or other relative humidity and/or dew point monitoring device. The unexpected success obtained through the use of an instrument of this type for targeting and achieving substantially any desired product result in the present invention is particularly surprising in view of the fact that the concept of "relative humidity" above the intended operational limit of such instruments (i.e., the boiling point of water) is, at best, ambiguous. Even more surprising is the discovery that the resulting purported "percentage" or other equivalent readings indicated on the relative humidity percentage scales or corresponding scales (e.g., "dew point temperature") of such instruments can be used in the inventive process to successfully control steam injection rates for achieving specific product results even though, in many and perhaps even most cases, most or all of the air in the oven 10 will actually have been replaced with superheated steam.

The sensor for the Vaisala dry cup dew point transmitter or other device can be placed at generally any desired location within the spiral oven 10. Although readings can be monitored at any desired location or at a plurality of points within the spiral oven 10, the analyzer readings for the cooking medium will preferably be taken close to the actual cooking point, most preferably at a midpoint elevation in the cooking chamber 15 and as close to the product as is reasonably feasible.

When using a Vaisala dry cup analyzer or similar instrument in the inventive process, the rate of steam addition to the spiral oven 10 will preferably be controlled to maintain a targeted analyzer reading in the range of from at least 10% to 100%. In most cases, a targeted instrument reading in the range of from about 15% to about 90%, more preferably from about 20% to about 85%, will be used to control the rate of steam injection to obtain the particular product characteristics desired. Once again, this control method has been found to be very effective for use in the inventive process even though the instrument may not actually be, and likely is not, measuring a true "relative humidity" of the heated cooking medium.

Depending upon the desired operating ranges (e.g., the temperature range used and whether the environment is substantially oxygen free or contains oxygen) and other factors, it will be understood that oxygen analyzers or other types of instruments could be used to monitor and maintain targeted conditions within the spiral oven 10 in at least some cases.

In further contrast to the industry trend toward using higher flow velocities, even in spiral ovens, the inventive process also unexpectedly provides surprising bacon cooking benefits by circulating the cooking medium within the spiral oven in a more gentle, convective, nonimpinging manner such that the cooking medium contacts the bacon slices 4 at a flow velocity which is sufficiently low to prevent the bacon slices 4 from being displaced on (i.e., to prevent the bacon slices 4 from being moved on or blown off of) the conveyor belt 8.

The contacting flow velocity within different regions of the cooking chamber 15 could vary depending upon the degree of doneness of the product at any given point. Although some heavier raw bacon products entering the cooking chamber 15 could be contacted at a low flow velocity of as much as 42 feet per second without displacing the product on the belt 8, the flow velocity, at least in the upper region of the cooking chamber 15, will preferably be lower in order not to displace the lighter, cooked bacon product. Consequently, the circulation rate within at least the upper region of the cooking chamber 15 will preferably be sufficiently low that the cooking medium will contact the bacon slices 4 at a flow velocity of not greater than 20 feet per second. The contacting velocity in at least the upper portion of the cooking chamber 15 will more preferably not be greater than 10 feet per second and will most preferably be only about 5.5 feet per second.

Spiral ovens adaptable for use in the inventive bacon cooking process are commercially available, for example, from Unitherm, Stein, Heat & Control, and C.F.S. The oven 10 will most preferably be a Unitherm Electric Spiral Oven. Although such spiral ovens are typically operated in other processes at much higher circulation rates, the spiral oven 10 will preferably be operated at a much lower circulation rate in the inventive process 2, as already mentioned, in order to provide a more gentle, convective flow over the product. The fan speed of the Unitherm Electric Spiral Oven, for example, will preferably be reduced to provide a circulation rate of not more than 500 cubic feet per minute (CFM) withal the oven 10.

The temperature and cooking time (i.e., belt speed) within the spiral oven 10 can be varied as desired to obtain generally any desired degree of crispness and generally any desired color ranging from light gold to dark golden brown. The average temperature of the cooking medium within the cooking chamber 15 will preferably be the range of from about 325° F. to about 650° F. or higher. Depending upon the degree of crispness and brownness required, the residence time of the product 4 within the spiral oven cooking chamber 15 will typically be in the range of from about 3 to about 9 minutes.

In a preferred "high temperature" embodiment of the inventive method, the average temperature of the cooking medium will preferably be at least 375° F. The average temperature of the cooking medium within the cooking chamber 15 in the "high temperature" embodiment will more preferably be controlled in the range of from about 385" to 550° F. and will most preferably be about 425° F. The residence/cooking time of the product within the spiral oven cooking chamber 15 in the "high temperature" embodiment will preferably be in the range of from about 3 to about 7 minutes and will most preferably be in the range of from about 4 to about 6 minutes. In addition, if a Vaisala dry cup analyzer or similar device is used to monitor the cooking medium within the cooking chamber 15, the amount of steam injected into the spiral oven 10 in the "high temperature" embodiment will preferably be controlled to maintain an analyzer reading which is or is equivalent to a value in the range of from about 15% to about 45%, most preferably in the range of from about 20% to about 35%, on the purported "relative humidity" percentage scale of the Vaisala analyzer.

In an alternative "low temperature" embodiment, the average cooking medium temperature will preferably be in the range of from about 325° F. to about 385° F. (most preferably about 350° F.), the analyzer reading for the cooking medium will preferably be maintained in the range of from about 45% to about 85% (most preferably about 75%), and the cooking time will preferably be in the range of from about 6.5 to about 9 minutes (most preferably about 8 minutes). The "low temperature" embodiment eliminates smoke and provides a product with little or no pit flavor notes.

The heating elements 14 employed in the spiral oven 10 can be thermal oil elements, steam elements, electric elements, or any other type of element capable of heating the circulating cooking medium within the oven 10 to the temperature desired. Because of the relatively high cooking temperatures typically preferred in the inventive process 2 and in order to provide a broad range of possible temperatures and results, the heating elements 14 will preferably be finned electrical heating elements capable of heating the circulating cooking medium to a cooking temperature of 650° F. or higher. In addition, to ensure that a highly consistent cooked product 32 is obtained and that none of the cooked product 32 is either undercooked or overcooked, those in the art will understand that the electrical heating elements 14 used in the spiral oven 10 will preferably be tightly controlled at the desired set point using a thyristor or similar device.

Because there is no need for the flow of makeup air into the spiral oven 10 when employed in the inventive indirect cooking process 2, the inlet opening 26 and the outlet opening 28 for the conveyor 8 can each be "choked" in order to (a) minimize the energy losses from the oven 10 to the atmosphere, (b) further stabilize the cooking conditions therein, and (c) assist in establishing something of a positive pressure condition in the spiral oven 10, when desired. Each of the inlet and outlet openings 26 and 28 will preferably be only slightly wider than the oven belt 8 and will preferably be sufficiently limited in height to provide not more than a 10 mm clearance, most preferably not more than a 6 mm clearance, above the belt 8.

The high moisture content of the cooking medium, combined with the relatively high temperature within the oven 10, the gentle convective flow therein, and the natural basting provided by the upward spiral path of the product through the oven 10, unexpectedly and surprisingly provides unique benefits and advantages which have not been provided by the circulating air systems and other systems heretofore tried for cooking bacon slices. Even more surprisingly, these features of the inventive process unexpectedly combine to yield a cooked sliced bacon product 32 which has much more of a pan-fried texture, bite, mouth feel, appearance, and color than the previously preferred products produced using continuous microwave systems. The high moisture, high enthalpy cooking medium employed in the inventive spiral oven process 2 also facilitates heat transfer into the sliced bacon product 4 and greatly reduces or eliminates the fire risk posed by the prior circulating air cooking systems.

Moreover, the high water vapor content used and the other characteristics of the inventive spiral oven process 2 operate to enhance the browning process and protect the product during cooking so that much more of a pan-fried color and a pan-fried crispness are obtained without burning or blackening the edges of the product. The bacon product is preferably preconditioned prior to delivery to the slicer such that the bacon slices 4 deposited on the oven conveyor belt 8 will have a low surface temperature, typically in the range of from about −6° to about 5° C. Because of the low initial surface temperature of the raw bacon slices 4 and because of the high superheated water vapor content within the spiral oven 2, a small amount of water from the cooking medium initially condenses on the surface of the product 4, typically in micro droplet form, as the product enters the oven 10. The condensate which initially forms on the product surface heats rapidly, but it does so in conjunction with the fat on the product surface which unexpectedly allows the fat to boil and to color the outer edges of the product without burning. Then, combined with the unexpected benefit provided by the initial surface condensation effect, the fat drippage basting regime within the oven 10 from each spiral flight 34 to the next further operates to develop the color, crispness, and bite desired.

In addition, in an alternative embodiment of the inventive method, the raw bacon slices 4 can optionally be pretreated prior to entering the spiral oven cooking chamber 15 by contacting the raw slices 4 with dry (i.e., superheated) steam. The pretreating steam temperature will preferably be about 250° F. The optional steam pretreatment begins the moisture crusting process and assists in producing a flatter sliced product.

EXAMPLE

A Grote Slicer is used to cut bacon slices directly onto the conveyor infeed section 6 of a Unitherm Electric Spiral Oven 10 of the type illustrated in the drawing. The bacon slices are each two inches wide, 10 inches in length, and have a thickness of about 3 mm. The bacon slices have an initial surface temperature of −6° C. The belt 8 of the spiral oven 2 is an open wire mesh belt which is 36 inches wide and which receives and conveys the raw bacon slices in a three lane arrangement across the belt at a total rate of 900 raw slices per minute. This is equivalent to a total feed rate of 5400 pounds per hour of raw sliced bacon.

The oven 10 utilizes finned electrical elements 14 which are operated to provide an average cooking medium temperature within the cooking chamber 15 of 425° F. The cooking medium within the oven cooking chamber 15 is monitored using a Vaisala dry cup dew point analyzer. An analyzer value of 24% for the cooking medium is maintained by the injection of 40 psig superheated steam at about 268° F. The injection of steam produces a positive pressure condition within the spiral oven 10 which is slightly above atmospheric pressure. The speed of the spiral conveyor 8 is set to provide a cooking time of 5.5 minutes. The oven ran speed is set to provide a cooking medium circulation rate within the oven 10 of 300 cubic feet per minute.

The resulting cooked product has a crispness, appearance, and degree of golden brown color which are substantially the same as a bacon product which has been pan fried at 500° F. for 5 minutes (i.e., 2.5 minutes per side).

* * *

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. A process for continuously cooking and browning bacon slices in a spiral oven to produce a pre-cooked slices bacon product resembling a pan-fried bacon product, the spiral oven having a cooking chamber which houses a conveyor that travels in a spiral pattern between a lower inlet opening and an upper outlet opening of the cooking chamber, the process comprising the steps of:
   (a) creating a substantially air-free environment in the cooking chamber of the spiral oven by adding an amount of superheated steam to the cooking chamber such that the air normally present in the cooking chamber without adding the superheated steam is reduced by about 100%;
   (b) cooking and browning bacon slices in the substantially air-free environment of the cooking chamber as the bacon slices are being carried upwardly in the spiral pattern by the conveyor by contacting the bacon slices with a superheated vapor cooking medium circulating in the spiral oven so as to not displace each bacon slice from its respective position in the conveyor;
   (c) maintaining the substantially air-free environment of the cooking chamber by adding superheated steam to the superheated cooking vapor medium circulating in the cooking chamber in step (b);
   (d) maintaining a cooking and browning temperature of the superheated vapor cooking medium during the step (b) by passing the superheated vapor cooking medium circulating in the spiral oven over one or more heating elements which heat the superheated vapor cooking medium to a temperature of at least 325° F.; and
   (e) during the step (b) permitting fat to drip down from bacon slices located at higher levels within the cooking chamber to baste bacon slices residing at lower levels.

2. A process according to claim 1 further comprising the step of preheating the bacon slices prior to entering the cooking chamber for the step (b).

3. A process for continuously cooking and browning bacon slices in a spiral oven to produce a pre-cooked sliced bacon product resembling a pan-fried bacon product, the spiral oven having a cooking chamber which houses a conveyor that travels in a spiral pattern between a lower inlet opening and an upper outlet opening of the cooking chamber, the process comprising the steps of:
   (a) eliminating the air normally present in the cooking chamber by adding an amount of superheated steam to the cooking chamber in a manner effective to substantially eliminate all of oxygen normally present to create a substantially oxygen-free environment in the cooking chamber;
   (b) cooking and browning the bacon slices in the substantially oxygen-free environment of the cooking chamber as the bacon slices are being carried in the spiral pattern by the conveyor by contacting the bacon slices with a superheated vapor cooking medium so as to not displace each bacon slice from its respective position on the conveyor;
   (c) maintaining the substantially oxygen-free environment of the cooking chamber during the step (b);
   (d) maintaining a temperature of the cooking chamber during the step (b) by passing the superheated vapor cooking medium circulating in the spiral oven over one or more heating elements which heat the superheated vapor cooking medium to a temperature of at least 325° F., no makeup air flow being added to the cooking chamber; and
   (e) during the step (b) permitting fat to drip down from bacon slices located at higher levels within the cooking chamber to baste bacon slices residing at lower levels.

* * * * *

UNITED STATES PATENT AND TRADEMARK OFFICE
CERTIFICATE OF CORRECTION

PATENT NO. : 9,510,610 B2
APPLICATION NO. : 13/401167
DATED : December 6, 2016
INVENTOR(S) : David Howard Page 1 of 1

It is certified that error appears in the above-identified patent and that said Letters Patent is hereby corrected as shown below:

In the Claims

Column 9, Line 31, Claim 1, change the word "slices" to --sliced--. (second occurrence)

Column 10, Line 27, Claim 3, delete the word "of".

Signed and Sealed this
Sixth Day of February, 2018

Joseph Matal
*Performing the Functions and Duties of the
Under Secretary of Commerce for Intellectual Property and
Director of the United States Patent and Trademark Office*